(12) United States Patent
Czainski et al.

(10) Patent No.: US 9,067,496 B2
(45) Date of Patent: Jun. 30, 2015

(54) ROUTE FOR VEHICLES AND METHOD OF BUILDING THE ROUTE

(75) Inventors: Robert Czainski, Szczecin (PL); Oliver Vietzke, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 93 days.

(21) Appl. No.: 13/885,479

(22) PCT Filed: Nov. 22, 2011

(86) PCT No.: PCT/EP2011/070716
§ 371 (c)(1),
(2), (4) Date: May 15, 2013

(87) PCT Pub. No.: WO2012/069494
PCT Pub. Date: May 31, 2012

(65) Prior Publication Data
US 2013/0233663 A1    Sep. 12, 2013

(30) Foreign Application Priority Data
Nov. 22, 2010  (GB) .................................. 1019799.4

(51) Int. Cl.
*B60L 9/00*    (2006.01)
*B60L 5/00*    (2006.01)
*B60M 1/34*    (2006.01)
*B60M 7/00*    (2006.01)

(52) U.S. Cl.
CPC . *B60L 9/00* (2013.01); *B60L 5/005* (2013.01); *B60M 1/34* (2013.01); *B60M 7/003* (2013.01); *B60L 2200/26* (2013.01)

(58) Field of Classification Search
CPC .............. B60L 11/182; B60L 11/1831; B60L 11/1837; B60L 11/1824; B60L 5/00; B60L 5/005; B60L 1/003; B60L 3/003; B60L 9/24; B60L 7/14; H02J 5/005; H02J 7/025; B60M 1/36; B60M 7/00; B60M 7/003
USPC .......................................................... 191/10
See application file for complete search history.

(56) References Cited

U.S. PATENT DOCUMENTS 896,984 A  *  8/1908  Freeman ........................ 138/103
3,815,304 A  *  6/1974  Schille et al. ................... 52/100
(Continued)

FOREIGN PATENT DOCUMENTS

DE    19746919 A1    5/1999
EP    0289868 A2    11/1988
(Continued)

*Primary Examiner* — Jason C Smith
(74) *Attorney, Agent, or Firm* — The Webb Law Firm

(57) ABSTRACT

A route for vehicles driving on a surface of the route includes a plurality of shaped blocks adapted to position and/or to hold a plurality of line sections of one or more electric line. Each shaped block comprises recesses forming spaces and/or projections delimiting spaces for receiving at least one of the line sections. The electric line or lines extend(s) through the spaces and extend(s) along the surface of the route in and/or about the travelling direction of vehicles. The shaped blocks and the electric line or lines are supported by a base layer of the route and are covered by a cover layer of the route. The material of the cover layer is also located in regions of the route sideways of the shaped blocks so that the shaped blocks and the cover layer form an integrated layer on top of the base layer.

23 Claims, 10 Drawing Sheets

(56) References Cited

U.S. PATENT DOCUMENTS

| | | | |
|---|---|---|---|
| 4,331,225 A | 5/1982 | Bolger | |
| 4,836,344 A * | 6/1989 | Bolger | 191/10 |
| 5,207,304 A * | 5/1993 | Lechner et al. | 191/10 |
| 5,573,090 A * | 11/1996 | Ross | 191/10 |
| 5,669,470 A * | 9/1997 | Ross | 191/10 |
| 6,407,470 B1 * | 6/2002 | Seelig | 307/104 |
| 6,651,566 B2 * | 11/2003 | Stephan et al. | 104/288 |
| 8,240,406 B2 * | 8/2012 | Stoicoviciu et al. | 180/2.1 |
| 8,292,052 B2 * | 10/2012 | Bohori et al. | 191/10 |
| 8,418,823 B2 * | 4/2013 | Matsumura | 191/10 |
| 8,827,058 B2 * | 9/2014 | Vollenwyder et al. | 191/10 |
| 2005/0178632 A1 * | 8/2005 | Ross | 191/10 |
| 2010/0244583 A1 * | 9/2010 | Shimokawa | 307/104 |
| 2011/0163542 A1 * | 7/2011 | Farkas | 290/2 |
| 2011/0198176 A1 * | 8/2011 | Meins et al. | 191/10 |
| 2011/0253495 A1 * | 10/2011 | Vollenwyder et al. | 191/10 |
| 2011/0315496 A1 * | 12/2011 | Bohori et al. | 191/10 |
| 2012/0103741 A1 * | 5/2012 | Suh et al. | 191/10 |
| 2012/0186927 A1 * | 7/2012 | Suh et al. | 191/10 |
| 2012/0261482 A1 * | 10/2012 | Vollenwyder et al. | 238/14.05 |
| 2013/0037365 A1 * | 2/2013 | Ichikawa | 191/10 |
| 2013/0098723 A1 * | 4/2013 | Cho et al. | 191/10 |
| 2013/0233663 A1 * | 9/2013 | Czainski et al. | 191/10 |
| 2014/0015312 A1 * | 1/2014 | Niizuma | 307/9.1 |
| 2014/0138199 A1 * | 5/2014 | Ichikawa et al. | 191/10 |
| 2014/0151175 A1 * | 6/2014 | Vietzke | 191/10 |
| 2014/0174870 A1 * | 6/2014 | Niizuma | 191/10 |
| 2014/0217966 A1 * | 8/2014 | Schneider et al. | 320/108 |
| 2014/0225434 A1 * | 8/2014 | Niizuma | 307/10.1 |
| 2014/0238804 A1 * | 8/2014 | Vietzke et al. | 191/10 |
| 2014/0292266 A1 * | 10/2014 | Eger et al. | 320/108 |

FOREIGN PATENT DOCUMENTS

| | | |
|---|---|---|
| GB | 2476313 A | 6/2011 |
| GB | 2476318 A | 6/2011 |
| WO | 9530556 A2 | 11/1995 |
| WO | 2010031596 A2 | 3/2010 |
| WO | 2011076435 A1 | 6/2011 |

* cited by examiner

ROUTE FOR VEHICLES AND METHOD OF BUILDING THE ROUTE

BACKGROUND OF THE INVENTION

1. Field of the Invention

The invention relates to a route for vehicles and a method of building the route. The vehicle can be, for example, a road automobile having wheels which can be steered by a driver of the vehicle. However, it is also possible that a track-bound vehicle travels on the route, such as a rail vehicle driving on rails which are embedded in the route.

2. Description of Related Art

While travelling on a route vehicles require energy for driving for auxiliary equipment which does not produce traction of the vehicle. Such auxiliary equipment includes, for example, lighting systems, heating and/or air-conditioning systems, ventilation and passenger information systems. Not only track-bound vehicles (such as trams), but also road automobiles can be operated using electric energy. If continuous electric contact between the travelling vehicle and an electric rail or wire along the route is not desired, electric energy can be either be withdrawn from an on-board energy storage or can be received by induction from an arrangement of electric lines of the route.

The transfer of electric energy to the vehicle by induction forms a background of the invention. A route side (primary side) conductor arrangement produces an electromagnetic field. The field is received by a coil (secondary side) on board of the vehicle so that the field produces an electric voltage by induction. The transferred energy may be used for propulsion of the vehicle and/or for other purposes such as providing auxiliary systems of the vehicle (e.g. the heating and ventilating system) with energy.

Generally speaking, the vehicle may be, for example, a vehicle having an electrically operated drive motor. However, the vehicle may also be a vehicle having a hybrid drive system, e.g. a system which can be operated by electric energy or by other energy, such as energy provided using fuel (e.g. natural gas, diesel fuel, petrol or hydrogen).

WO 95/30556 A2 describes a system wherein electric vehicles are supplied with energy from the roadway. The all-electric vehicle has one or more on-board energy storage elements or devices that can be rapidly charged or supplied with energy obtained from an electrical current, for example a network of electromechanical batteries. The energy storage elements may be charged while the vehicle is in operation. The charging occurs through a network of power coupling elements, e.g. coils, embedded in the track. Induction coils are located at passenger stops in order to increase passenger safety.

In contrast, the focus of the present invention is to continuously transfer energy to the vehicle while it travels on the route. WO 2010031596 A2 discloses a shaped block for positioning and/or holding a plurality of line sections of one or more electric lines along a driving way of a vehicle, wherein the shaped block has a plurality of recesses and/or projections, wherein the edges of the recesses and/or projections for the line sections in each case form the boundary of a space, into which one of the line sections can be brought, so that it extends in a longitudinal direction of the space, and wherein the longitudinal directions of the spaces, bounded by the edges of the recesses and/or by the projections, extend essentially parallel to one another in a common plane.

If an alternating electric current flows through the electric lines, an electromagnetic field is produced that induces an electric current in a receiver of a vehicle which is travelling on the driving way. The shaped blocks facilitate the laying of the electric lines in the driving way. WO 2010031596 A2 discloses ways of integrating the shaped blocks in railways for rail vehicles. For example, the shaped blocks are placed in between the rails, the electric lines are laid into the spaces defined by the blocks and the blocks are covered by lids.

U.S. Pat. No. 4,836,344 discloses an electrical modular roadway system adapted for transmitting power to and controlling inductively coupled vehicles travelling thereon. The system comprises a plurality of elongated, electrically connected inductor modules arranged in an aligned end to end spaced apart order to form a continuous vehicle path. Each module has a magnetic core and power windings which generate a magnetic field extending above the road surface. The modules are embedded in the ground so as to be flush with the roadway surface over which a vehicle can travel. Each module is an elongated structure of uniform width and thickness so that they can be easily fabricated in quantity and readily installed in a roadbed with a minimum of labor and equipment. Each module comprises an iron core around which is wrapped a power winding comprising a series of coils.

SUMMARY OF THE INVENTION

It is an object of the present invention to provide a route for vehicles, including at least one electric line for inductively transferring energy to the vehicles travelling on the route, wherein the route shall be robust and it shall be possible to build the route with low effort. In particular, it shall be possible for vehicles to drive across the region of the route where the electric line or electric lines are laid.

The modules and the arrangement disclosed in WO 2010/031596 A2 which comprise lids for covering the modules are perfectly suited for building tracks of rail vehicles, but are not intended to be used in routes for road vehicles.

Regarding the disclosure in U.S. Pat. No. 4,836,344, it is a basic finding of the present invention that the arrangement of modules includes disadvantages which reduce robustness and increase the effort for building and maintenance of the roadway. Although the modules are pre-fabricated before they are laid on the route, electric connections between consecutive modules need to be assembled on site. Therefore, dirt and water may cause corrosion and cracks, especially in winter and enhanced by vibrations which always happen while vehicles travelling on the route.

It is a basic concept of the invention to use pre-fabricated shaped modules, in particular the modules of any embodiment disclosed in WO 2010/031596 A2, to place the shaped modules and the at least one electric line on site where the route is to be built and to cover the shaped blocks and the electric line or lines by a cover layer of the route. In particular, the material of the cover layer may be any suitable material, such as asphalt, concrete or other material well known for building of roadways.

In particular, the following is proposed: A route for vehicles driving on a surface of the route, in particular for road automobiles, wherein:
  the route comprises a plurality of shaped blocks adapted to position and/or to hold a plurality of line sections of one or more electric lines,
  each shaped block comprises recesses forming spaces and/or projections delimiting spaces for receiving at least one of the line sections,
  the electric line or lines extend(s) through the spaces,
  the electric line or lines extend(s) along the surface of the route in and/or about the travelling direction of vehicles which are driving on the route, the shaped blocks and the electric line or lines are supported by a base layer of the route, the shaped blocks and the electric line or lines are covered by a cover layer of the route, the material of the cover layer is also located in regions of the route sideways of the shaped blocks so that the shaped blocks and the cover layer form an integrated layer on top of the base layer.

The cover layer or at least one additional, optional, cover layer forms the surface of the route on which vehicles can travel. In case of concrete, it is preferred that there is a single cover layer which covers the shaped blocks and the electric line(s) and preferably also forms the regions sideways of the shaped blocks so that the thickness of the cover layer is greater sideways of the shaped blocks compared to the thickness of the cover layer on top of the shaped blocks. As a result, the shaped blocks and electric line(s) are fixed by the material of the cover layer. This way of building a route is particularly easy to perform, since standard procedures and machines for producing cover layers can be used to produce the cover layer according to the present invention.

Compared to the roadway construction disclosed in U.S. Pat. No. 4,836,344 and compared to similar constructions, the shaped blocks and the electric line(s) are firmly integrated in the integrated layer and, therefore, vehicles may drive on the shaped blocks, including crossing the line of consecutive shaped blocks which extends in the normal travel direction. For example, this would be the case if a vehicle travels on the roadway and leaves or joints the track where the consecutive line of shaped blocks is laid. In addition, since the cover layer fully covers the shaped blocks, the shaped blocks and electric line(s) are protected against dirt, water and, depending on the type of cover layer, moisture.

Preferably, the route comprises gaps between consecutive sections of the route in the direction of travel, wherein the gaps extend perpendicular to the direction of travel and allow relative movement between the consecutive sections of the route due to movement of the underground and/or due to thermal expansion and contraction. Typically, these gaps are filled by elastically deformable material. It is preferred that at least one of these gaps coincides with a gap of consecutive shaped modules which are part of a line of consecutive shaped modules extending in the direction of travel of the route. Furthermore, it is preferred that the electric line or electric lines which are received by spaces of the consecutive shaped block extend continuously across the gap between the consecutive sections of the route and/or the gap between consecutive shaped blocks. This means that there is no electric connection at the gap which connects different electric lines, for example electric connectors or soldered electric connections. In addition, the electric line or lines preferably have a continuous outer layer forming an electric insulation, i.e. the outer layer extending continuously across the gap. Since electric lines, including their insulation, are typically elastically deformable to some extend, the electric lines extending across the gap deform in a corresponding manner to the extension or compression of the gap. This preferred embodiment of the route can easily be made by first placing the consecutive shaped blocks, than laying the electric line or lines and then covering the arrangement with the material of the cover layer thereby leaving the gaps and then treating the gaps in conventional manner, for example by filling the gaps with elastically deformable material. Any electric connections between electric lines are preferably made in a region of the route sideways of the lengthwise extension of a shaped module and/or in a cutup or cavity of the shaped module.

Corresponding to the proposed route for vehicles, a method of building a route for vehicles is proposed, wherein the following steps are performed:

providing a base layer of the route for supporting shaped blocks and an electric line or electric lines, providing a plurality of shaped blocks for positioning and/or holding a plurality of line sections of one or more electric lines, wherein each shaped block comprises recesses forming spaces and/or comprises projections delimiting spaces for receiving at least one of the line sections, laying the electric line or lines so that it/they extend(s) through the spaces and so that it/they extend(s) along the surface of the route (s) in and/or about the travelling direction of vehicles which are driving on the route, covering the shaped blocks and the electric line or lines by a cover layer of the route, placing material of the cover layer also in regions of the route sideways of the shaped blocks so that the shaped blocks and the cover layer form an integrated layer on top of the base layer.

Embodiments and advantages of the route and of the corresponding building method follow from each other.

The base layer may be any suitable base layer, in particular the base layer made of sand cement. The material of the cover layer and/or of the shaped block may be lean concrete, for example.

Preferably, there is an intermediate layer located between the base layer and the integrated layer, the intermediate layer decoupling the integrated layer and the base layer from each other, in particular for decoupling vibrations and/or relative movement due to different thermal expansion/contraction. For example, the intermediate layer may be made of asphalt.

Such an intermediate layer reduces stress and, therefore, increases durability of the integrated layer.

In particular, the material of the cover layer may fill gaps between the line sections and surfaces of the spaces which are formed by the recesses and/or which are delimited by the projections. Therefore, cavities within the integrated layer are avoided and the electric line or lines is/are fixed within the integrated layer. This embodiment of the route is particularly easy to produce since the shaped blocks can be arranged on site first, then the electric line or electric lines is/are laid and then the material of the cover layer is placed to form the cover layer and, at the same time, to fill the gaps.

Preferably, the same type of material is used for the shaped blocks and for the cover layer. For example, if shaped blocks are made of asphalt, the cover layer is made of asphalt as well. In case of concrete, types of concrete are preferred which do not comprise classical armoring. Rather, fibre concrete is preferred. Using the same material for the cover layer and for the shaped blocks preferably also means that the same kind of concrete or the same kind of asphalt is used.

Since the integrated layer comprises shaped blocks and additional material of the cover layer having the same type, the physical material properties are the same and, therefore, robustness and durability are increased. However, the interconnection of the shaped blocks and the cover layer can be further increased by the following: Preferably, the boundary surface of the shaped blocks towards the cover layer is cleaned for foreign material and/or is partly removed before the material of the cover layer is placed next to the shaped blocks in order to form the integrated layer. If the boundary surface of the shaped blocks is treated in this manner, the material of the shaped blocks and the material of the cover layer forms a continuous layer without any additional layer of foreign material at the boundary between cover layer and shaped block. This embodiment is based on the finding that production of shaped blocks typically results in a layer of foreign material on the surface of the shaped blocks.

The compound, which comprises the shaped blocks and the cover layer can be strengthened further by first protrusions, which protrude from the surface of at least one of the shaped blocks, wherein the first protrusions are fully embedded in the material of the cover layer. In particular, first protrusions can be made by inserting and fixing an anchor, for example made of metal. The anchor may have the shape of a rod, wherein one section of the rod in lengthwise direction is inserted in recess or bore of the shaped block and is fixed to the shaped block, in particular by filling adhesive material in the remaining gap between the anchor and the recess or bore. The adhesive material may be two-component adhesive. The other section of the anchor, which protrudes from the boundary surface of the shaped block is embedded in the cover layer. In case of an anchor having an elongated shape (such as a rod), the longitudinal direction of the anchor preferably extends in horizontal direction or in approximately horizontal direction.

For connecting consecutive shaped blocks (which can also be called "neighbouring shaped blocks") in a line of shaped blocks extending in the direction of travel, a similar embodiment is proposed: The route by comprise second protrusions, which protrude from the surface of at least one of the shaped blocks into a pocket of a neighbouring shaped block. This embodiment can be realized even if there is no first protrusion of the type mentioned above. However, the way of connecting the second protrusions to the shaped block and the kind of second protrusions may be the same as described above for the first protrusions. In particular, an anchor may be inserted in a recess or bore of the shaped block and may be fixed to the shaped block. Then, the neighbouring shaped block is placed next to the first shaped block so that the second protrusion or second protrusions extend into a recess or bore of the second shaped block and then the protrusion is fixed to the second shaped block, for example using an adhesive material, such as a two-component adhesive.

Preferably, a magnetic core material is integrated in the integrated layer. In particular, the magnetic core material (for example ferrite) is placed within a core space formed by recesses and/or delimited by projections of the shaped material. For example, a groove may extend on the upper side of the shaped block in the direction of travel of vehicles. Preferably, the magnetic core material is placed first in the respective core space, then the electric line or electric lines are placed in the respective spaces and then the cover layer is produced. Consequently, it is preferred that the magnetic core material is placed below line sections of the electric line(s) which extend across the magnetic core if viewed from above.

This embodiment is based on the finding (compared to U.S. Pat. No. 4,836,344) that it is not necessary to wrap the electric line(s) around a magnetic core.

In particular, as mentioned above, the core space may extend in the driving direction of vehicles driving on the route and sections of the electric line(s) is/are preferably extending transversely to the extension of the core space. For example, the electric line or lines may follow a meandering path which extends in the direction of travel.

Furthermore, it is preferred that the route comprises a shielding layer of electrically conducting material (for example aluminium) which is placed below the shape blocks, preferably below the intermediate layer, if present a shielding layer shields the electromagnetic field produced by an electric line or lines so that requirements concerning electromagnetic compatibility of EMC are met. For example, other electric lines or pipings may be buried in the ground below the route.

Particularly preferred is that there is magnetic core material and, in addition, a shielding layer.

The route may be equipped with electric and/or electronic devices which are adapted to operate the electric conductor arrangement (the arrangement which comprises the electric line or lines which are located within the integrated layer). One of the devices may be an inverter for generating an alternating current from a direct current. The direct current may be carried by a supply line which supplies electric energy to the conductor arrangement. The alternating current may be the current which is carried by the conductor arrangement to produce the electromagnetic field. Since comparatively high powers are required by the vehicle (if—as preferred—a propulsion motor is operated with the energy), a corresponding power inverter produces significant losses in form of heat power. However, the electric and/or electronic device for operation of the electric conductor arrangement may comprise other types of devices, such as power switches to switch on and off a section of the electric conductor arrangement, constant current devices for providing constant current through the electric line or lines, detection devices for detecting the presence of a vehicle, star point connections for electrically connecting a plurality of electric phase lines and other devices.

These devices can be arranged in boxes or other casings above ground. Therefore, the heat losses produced by the devices can easily be transferred to the ambience. However, this may result in unacceptable noise production if ventilators are used to force the cooling of the devices. Furthermore, especially within historic parts of cities, casings above ground are not acceptable. Therefore, at least some of the devices may be buried in the ground, e.g. sideways of the route and/or within a cut-out or cavity of at least one of the shaped blocks. In particular, a cut-out or cavity of the shaped block(s) may be used to reduce emission of electromagnetic fields to the environment. Preferably, the shaped blocks are narrower (in the direction perpendicular to the travel direction) than a typical vehicle driving on the route. Therefore, the vehicle shields the environment against emission from the shaped block and from any device in the cut-out or cavity. For example, a star point connection of different phase lines of the electric conductor arrangement (see below for an example) can be located in the cut-out or cavity.

The electric conductor arrangement of the route which produces the electromagnetic field may comprise at least one electric line extending along the path of travel of the vehicle in a serpentine manner (i.e. sections of the line which extend in the direction of travel are followed in each case by a section which extends transversely to the travel direction which in turn is followed again by a section which extends in the direction of travel and so on); in case of a plural-phase system preferably all lines of the conductor arrangement are arranged in this manner; the expression "serpentine" covers lines having a curved configuration and/or having straight sections with curved transition zones to neighbouring sections; straight sections are preferred, since they produce more homogenous fields. Another expression for "serpentine manner" is "meandering".

comprise at least two electric lines, wherein each line is adapted to carry a different one of phases of an alternating electric current; preferably, the electric conductor arrangement comprises three lines, each line carrying a different phase of a three-phase alternating current;

comprise a plurality of segments, wherein each segment extends along a different section of the path of travel of the vehicle; each segment may comprise sections of the at least two lines and each segment may be adapted to be switched on and off separately of the other segments. The phase line(s) of each segment may be electrically connected to the corresponding phase line of any consecutive segment (series connection of the phase lines). Alternatively, the phase line(s) of the consecutive segments may be insulated against each other and—for example—may be connected to the power supply via a separate inverter for each segment (parallel connection of the phase lines). In case of a parallel connected phase lines, all phase lines of a segment may be connected to each other at a star point. The length of a segment preferably differs from the length of a shaped module. Preferably, cables constituting the electric line of a phase are not connected to a consecutive cable, within a segment. This facilitates the establishment of the construction. E. g. The shaped blocks can be provided. Then, the cable can be laid and then the cover layer is established.

BRIEF DESCRIPTION OF THE DRAWINGS

Examples and preferred embodiments of the invention will be described with reference to the attached figures which show FIG. 1 schematically a road having two lanes, wherein electric lines are laid under the surface of one of the lanes using pre-fabricated shaped blocks, FIG. 2 a vertical cross section through a preferred embodiment of a route, for example part of the road shown in FIG. 1, FIG. 3 an exploded view of part of FIG. 2.

DETAILED DESCRIPTION OF THE INVENTION

Figure 1:
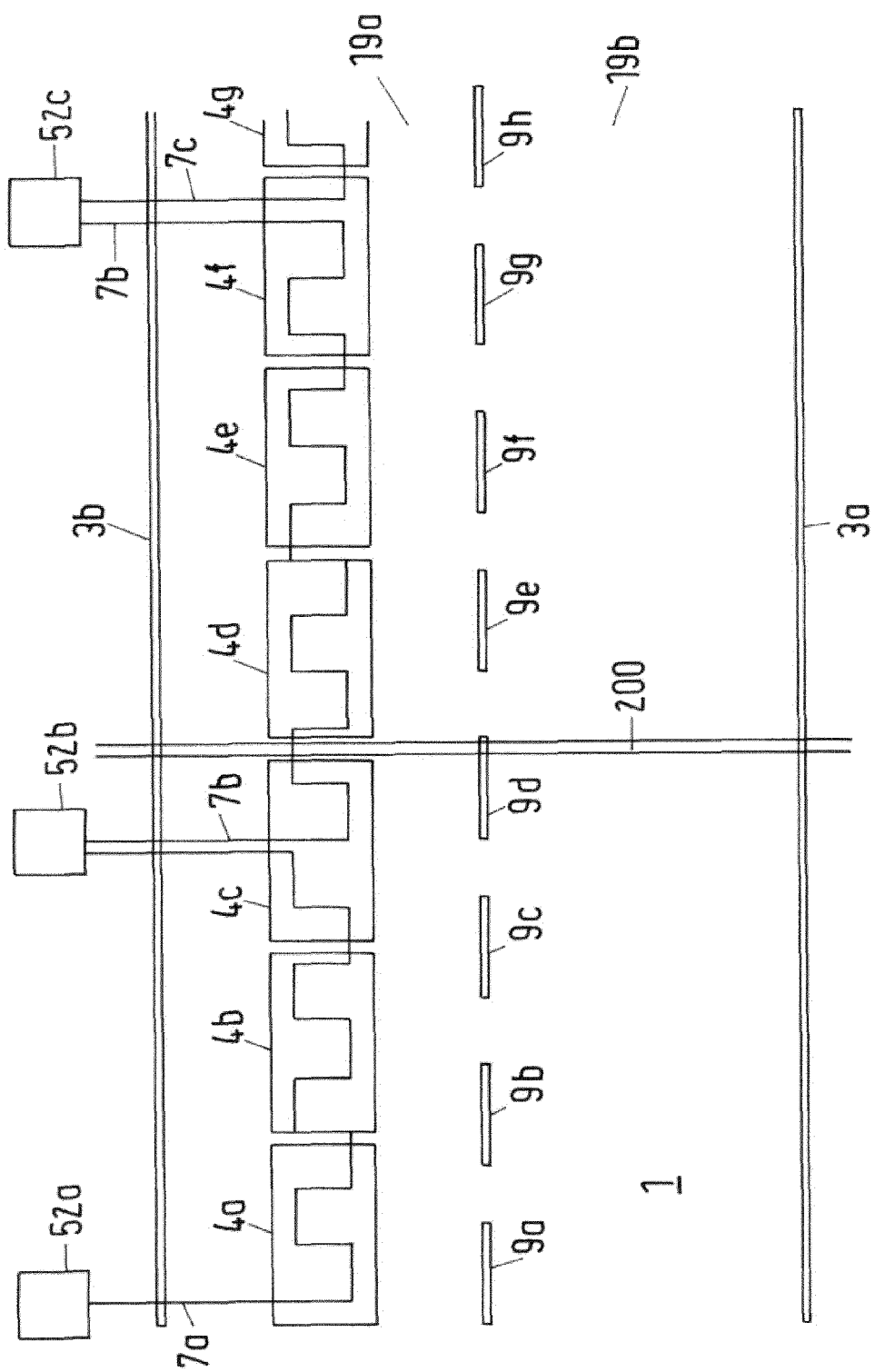

The schematic top view of FIG. 1 shows a road 1 having two lanes 19a, 19b. The lanes 19 are limited by a solid line 3a, 3b at the outer margins and are limited by a common dashed line made of line segments 9a, 9b, 9c, 9d, 9e, 9f, 9g, 9h. Consequently, the direction of travel extends from left to right or from right to left in FIG. 1. The width of the lanes 19 is large enough so that a vehicle can travel on either lane 19a or lane 19b or so that two vehicles can travel next to each other on the lanes 19.

One of the lanes, namely lane 19a, is equipped with a conductor arrangement 7a, 7b, 7c for producing an electromagnetic field. The conductors 7 (for example three electric phase lines in each segment of the conductor arrangement) and shaped blocks 4, which hold the conductors in place, are not visible in practice, if the road is viewed from above. However, FIG. 1 shows the conductors 7 and the line of consecutive shaped blocks 4a, 4b, 4c, 4d, 4e, 4f, 4g. The line of consecutive shaped blocks continues towards the right beyond the limits of FIG. 1. The conductor arrangement comprises at least three consecutive segments 7a, 7b, 7c which can be operated separately of each other. This means, for example, conductor 7a is operated while a vehicle (not shown) travels above the segment whereas the other segment 7b, 7c are not operated. If the vehicles reaches segment 7b, this segment is switched on and segment 7a is switched off. Corresponding switches and/or inverters may be integrated in devices 52a, 52b, 52c shown in the top region of FIG. 1.

The preferred way of laying the conductors 7 is to form a meandering path or paths, which means that the conductor has sections that extend transversely to the direction of travel. For example, conductor 7a has three transversely extending sections at shaped block 4a, one transversely extending section at the transition zone to consecutive block 4b, three transversely extending sections in the region of block 4b and one transversely extending section at block 4c where conductor 7a is connected to device 52b. In practice, it is preferred to use at least two phases for each segment of the conductor arrangement.

In the middle section of FIG. 1 there are two parallel lines extending transversely to the direction of travel. These lines are lines at the end of route segments having a gap 200 between each other for allowing relative movement and/or thermal expansion or contraction. The gap 200 is located between two consecutive shaped blocks 4c, 4d and conductor 7b extends across the gap 200 which may be filled with an elastically deformable material, such as bitumen.

Figure 2:
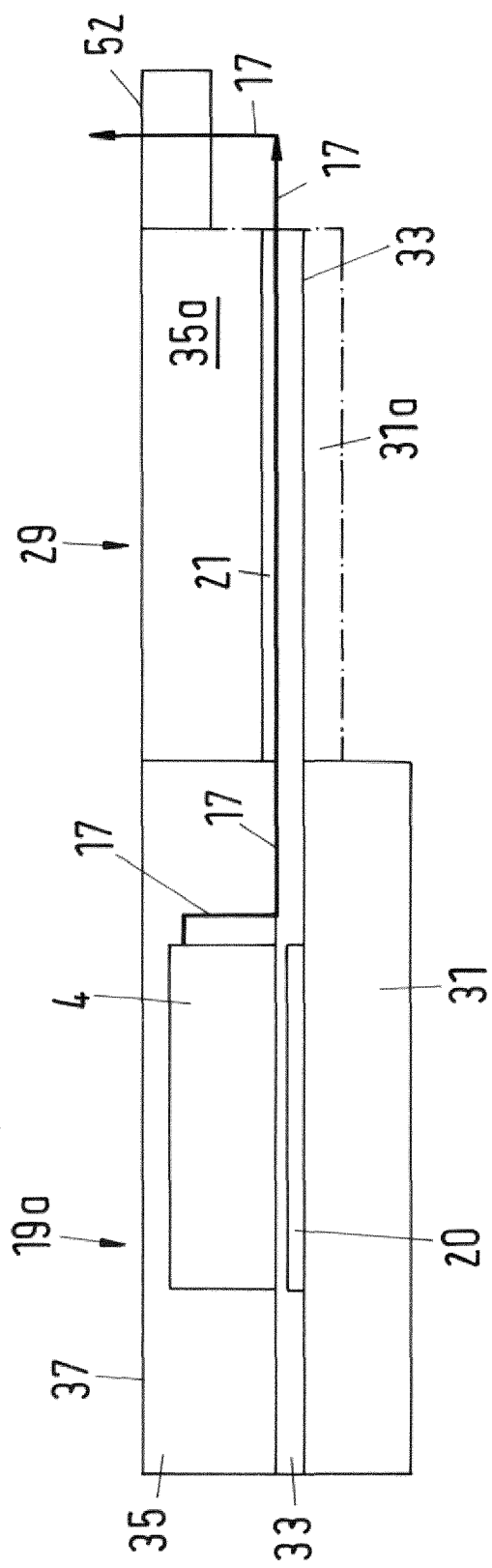

FIG. 2 shows a vertical cross section through a preferred embodiment of a route, wherein the direction of travel for vehicles travelling on the route extends perpendicularly to the image plane of FIG. 2. FIG. 2 may show, for example, a cross section of lane 19a of FIG. 1 and shows a cross section of an emergency lane which may be located in FIG. 1 in the top region where the devices 52 are shown. The emergency lane is indicated in FIG. 2 by reference numeral 29. Sideways, on the right hand side of emergency lane 29, one of the devices 52 is shown in FIG. 2.

Lane 19a comprises a base layer 31 which may have, for example, a layer thickness of 20 cm. On top of the base layer 31, a layer 20 of electrically conducting material (such as aluminium plates) is laid, for example having a thickness of 5 mm. The purpose of the layer 20 is to shield the electromagnetic field, i.e. to prevent or reduce electromagnetic waves below the layer 20. The layer 20 is narrower than the width of the lane 19a and may be in the range of the width of shaped block 4 which is placed above layer 20.

Shielding layer 20 is embedded in an intermediate layer 33 which may have a thickness of 5 cm, for example. On top of intermediate layer 33, shaped block 4 is placed, for holding electric lines 17, for example in the meandering manner similarly to the arrangement shown in FIG. 1. Block 4 may have a thickness of 15 cm, for example. The connection of electric line 17 from block 4 downwards to the upper surface of intermediate layer 33 and sideways through emergency lane 29 to device 55 is shown in FIG. 2.

Block 4 is embedded in a cover layer 35, which may have a thickness of 20 cm. Optionally, a top layer 37 may be provided to form the surface of lane 19a and the emergency lane 29.

Base layer 31 extends over the whole width of lane 19a. Emergency lane 29 may have a base layer 31a of the same material, but preferably having a smaller thickness of for example 8 cm. Cover layer 35 extends over the whole width of lane 19a, which means that it has regions on both sides of block 4 (which are regions sideway of the shaped block in the wording used above) and which means that the thickness of cover layer 35 sideways of block 4 is greater than the thickness of the cover layer 35 on top of block 4. Emergency lane 29 may have a cover layer 35a of the same material having a constant thickness. However, in order to shield the conductor 17, a layer 21 of electrically insulating material, for example aluminium (e.g. having a thickness of 1 cm) may be located at the bottom of cover layer 35a immediately above the connection of conductor 17. By such a shielding layer 21 which preferably extends over the whole widths of emergency lane 29, electromagnetic emission to the ambiance is significantly reduced. If segments of the conductor arrangement are operated only while a vehicle is travelling on the segment, the vehicle shields the ambience from the electromagnetic field produced by the conductor arrangement. Therefore, shielding the section of the conductor 17 between the emergency lane 29 and the shaped block 4 would result in a minor improvement only.

The base layer may be made of sand cement. The intermediate layer 33 may be made of asphalt. The shaped block 4 and the cover layer 35 may be made of fibre concrete.

Figure 3:
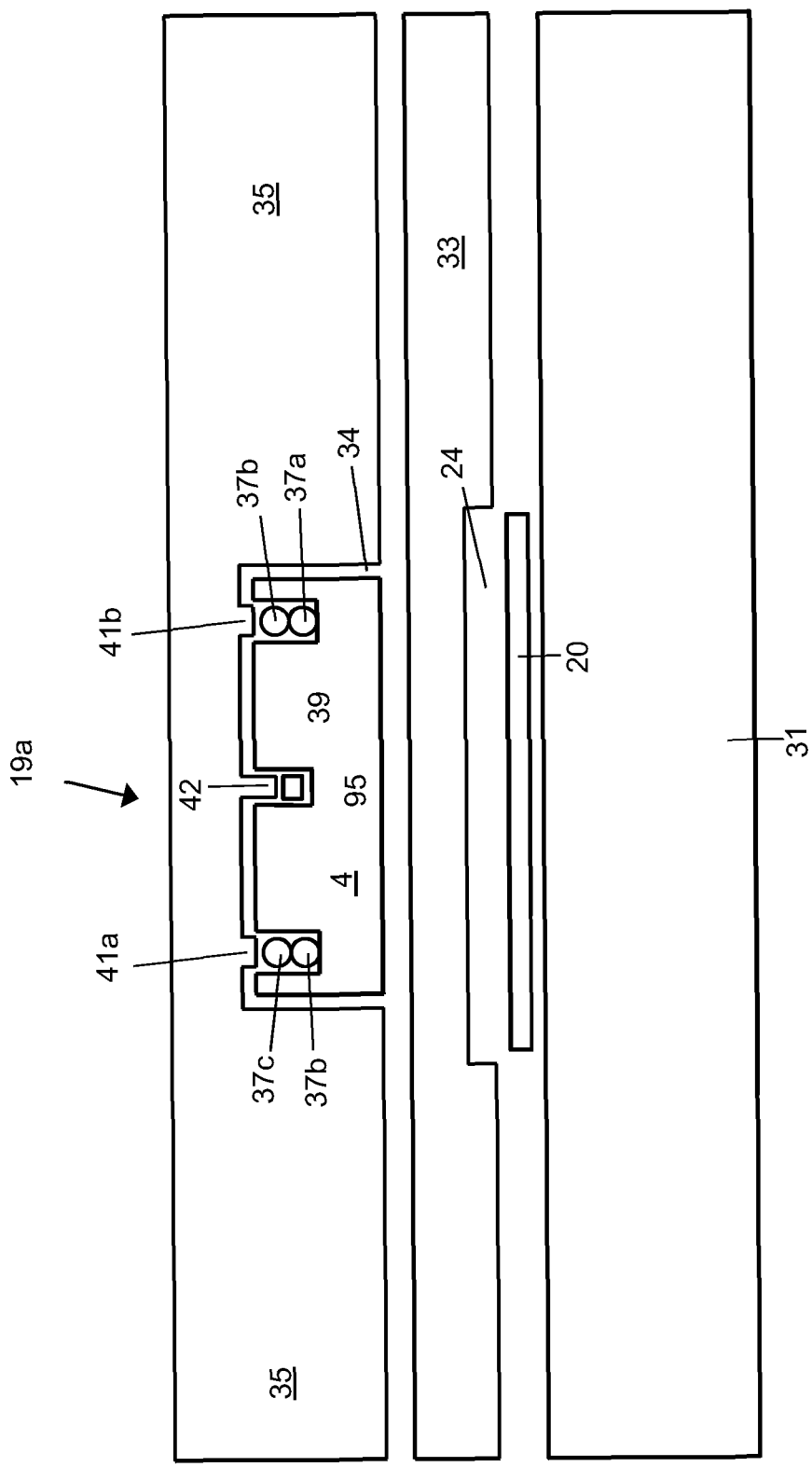

FIG. 3 shows an exploded view of the construction of lane 19a corresponding to the construction shown in FIG. 2. The same reference numerals refer to the same parts of the construction.

Since shielding layer 20 is provided before intermediate layer 33 is produced, intermediate layer 33 will have a recess 24 where shielding layer 20 is located.

Similarly, recesses within shaped block 4 which are facing upwards and which contain sections 37a, 37b, 37c of electric lines and which preferably contain also magnetic core material 39 within a recess 95 in the centre line of block 4, receive material portions 41a, 41b and 42 as schematically indicated in the top region of FIG. 3. These material regions preferable fill all or nearly all remaining gaps between electric line sections 37 or the magnetic core material 39 and the walls of the recesses.

Figure 4:
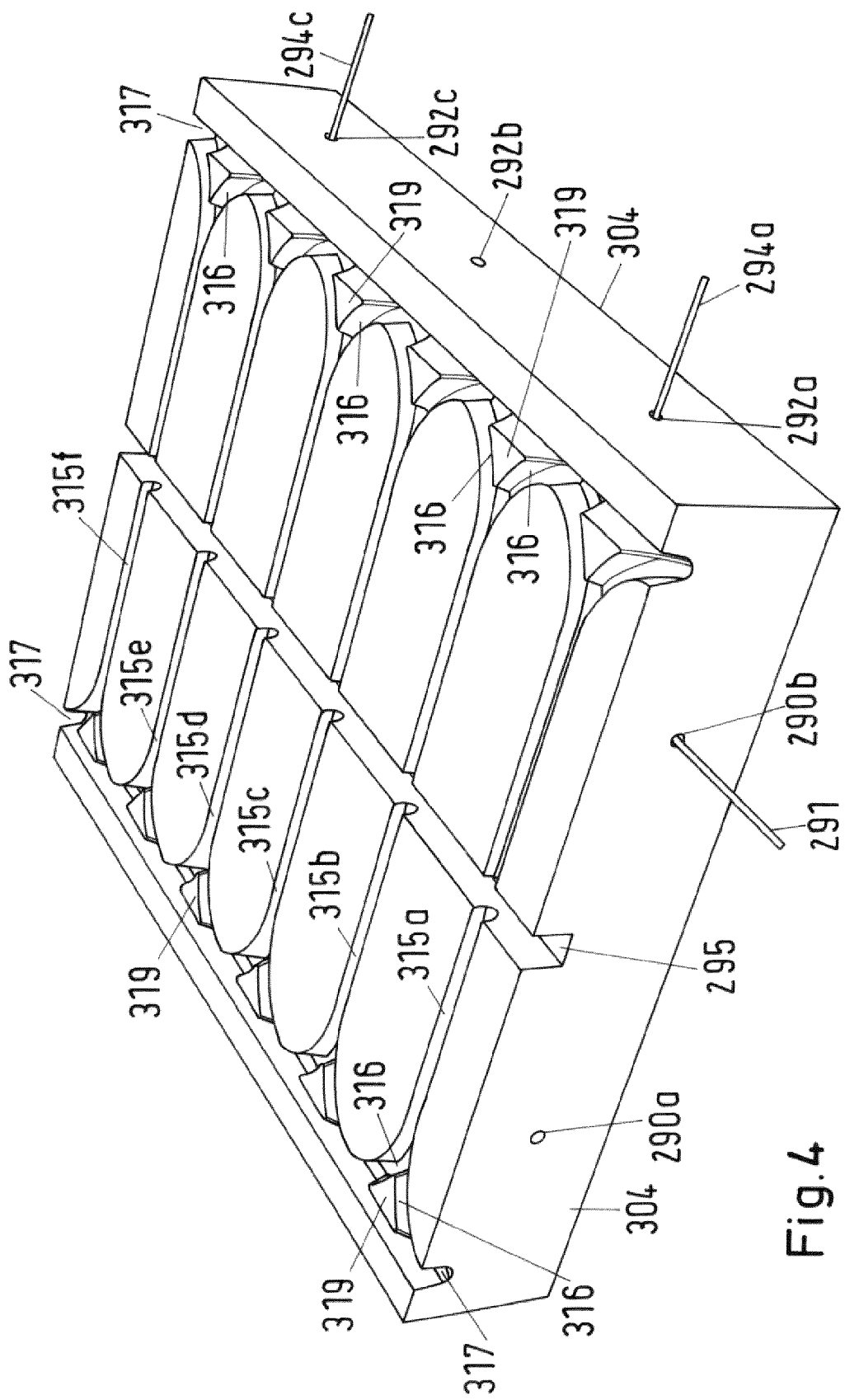
FIG. 4 shows a perspective view of a preferred embodiment of a shaped block, which can be used as a support element for supporting electric lines, in particular cables.
Figure 5:
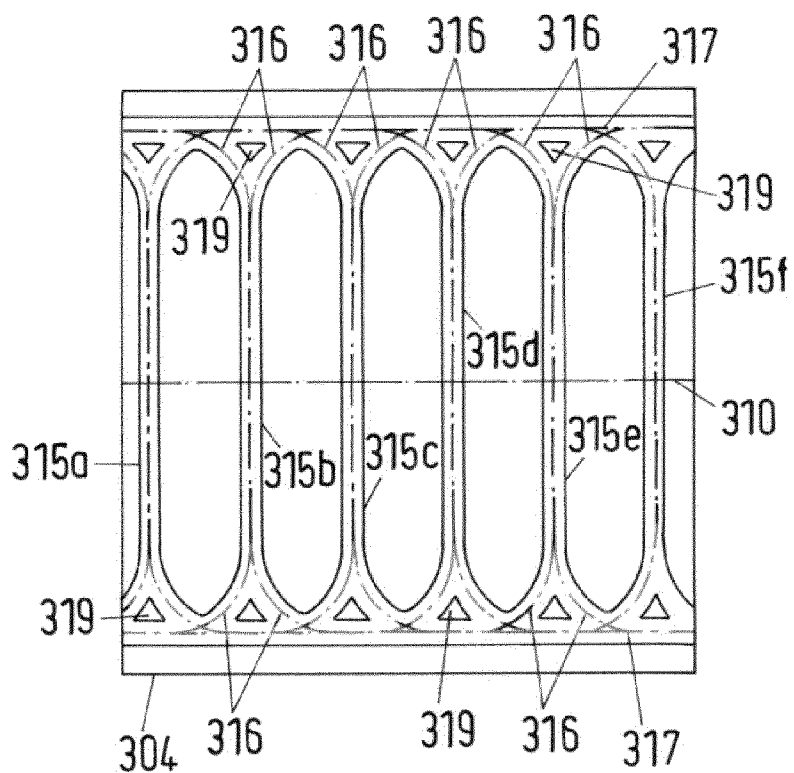
FIG. 5 shows a top view of the shaped block shown in FIG. 4.

FIG. 4 shows a perspective view of a shaped block 304 and FIG. 5 shows a top view of the shaped block 304, which comprises six recesses 315a-315f extending perpendicularly to a centre line 310 which divides the block 304 in two halves. The centre line 310 extends in the direction of travel of a vehicle, if the block 304 forms part of a route for the vehicle.

The recesses 315 are parallel to each other and are arranged within the same horizontal plane which is parallel to the plane of FIG. 5. The recesses 315 extend in width direction (the vertical direction in FIG. 5) over about three quarters of the total width of block 304. They are arranged symmetrically to the centre line 310.

Figure 10:
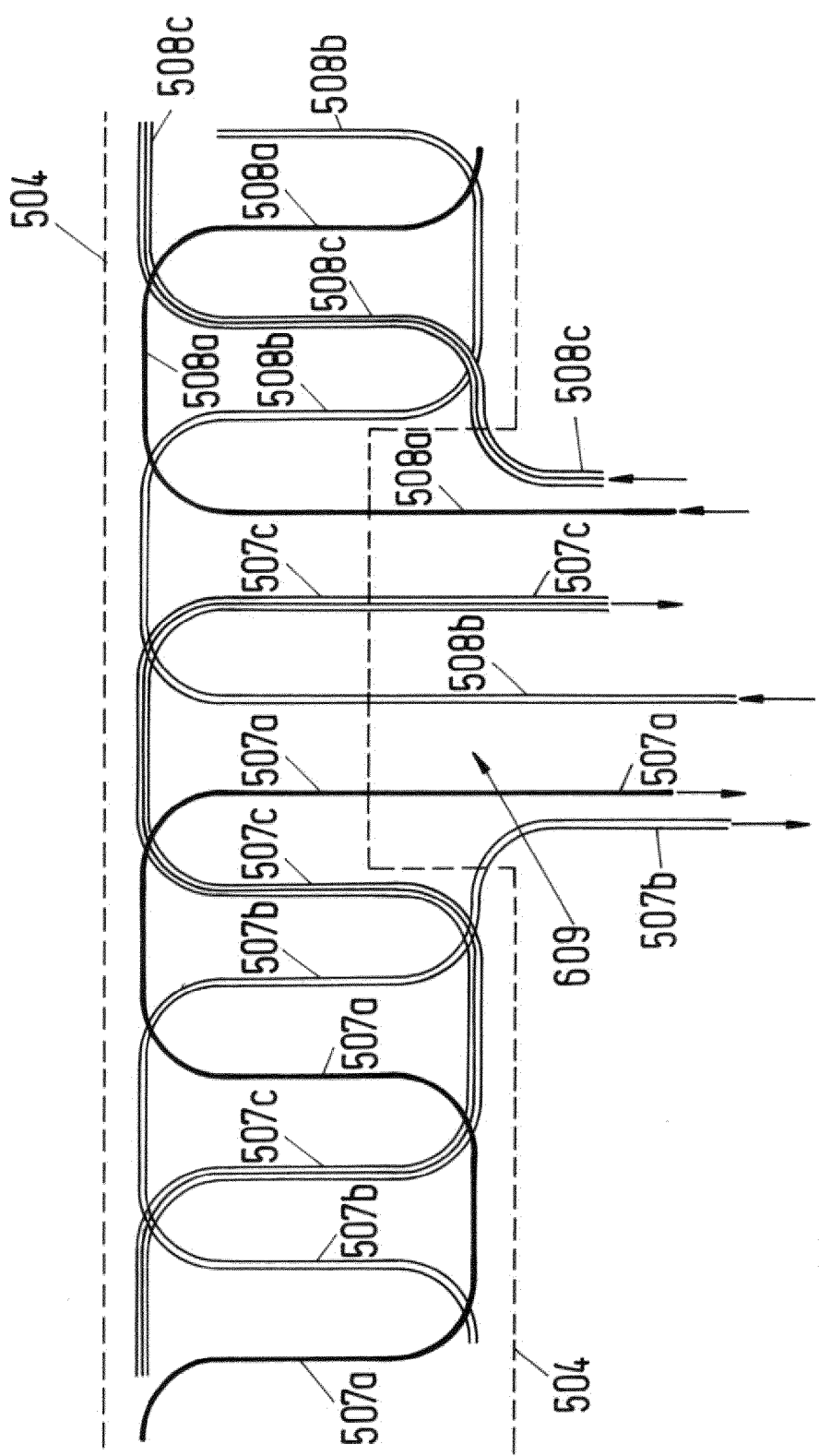
Figure 11:
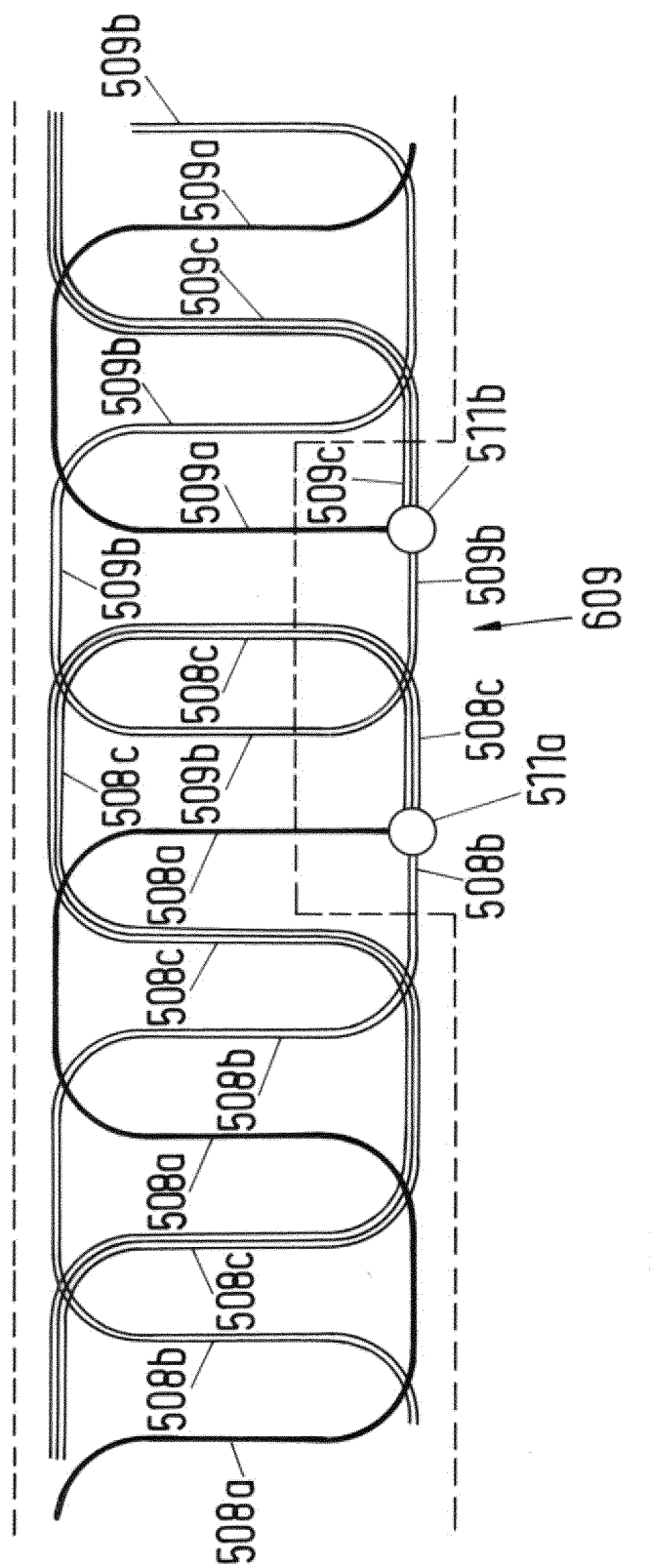

Each recess has a U-shaped cross-section to receive a cable. The dashed lines shown in FIG. 5 which extend along the recesses 315 are centre lines of the recesses 315. At each of the two opposite ends of the straight recesses 315, there are bifurcated curved recess regions 316 which form transitions to a peripheral straight recess 317 extending along the lateral edge of the block 304. Cables can be laid in a manner consecutively extending from the straight recesses 315 through the curved recess region 316 into the peripheral straight recess 317, thereby changing the direction of extension from perpendicular to the direction of travel to parallel to the direction of travel. Examples of arrangements of electric lines (e.g. cables) are shown in FIGS. 10 and 11 and will be described later.

The curved recess regions 316 allow for placing a cable, which extends through the recess 315, in such a manner that it continues to either the left or the right, if viewed in the straight direction of the recess 315. For example, a cable (not shown in FIGS. 4 and 5) may extend through recess 315b, may turn to the right—while extending through recess region 316—and may then extend through the straight recess 317 which extends perpendicularly to the recesses 315 on the opposite side of curved recess region 316. There are two peripheral straight recess regions 317 on opposite sides of block 304. The cable may then turn to the right through the recess region 316 at the end of recess 315e and may then extend through recess 315e. At the end of recess 315e, which is shown in the lower part of FIG. 5, the cable may again turn left through recess region 316 into the other straight recess 317. The other recesses 315 may be used for two other cables.

Figure 6:
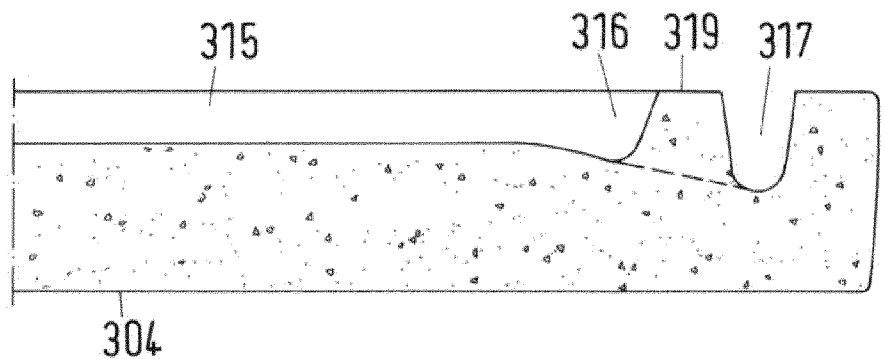
FIG. 6 shows a vertical cross-section through half of the block of FIGS. 4 and 5.

As shown in FIG. 6, the depth of the recesses 315, 316, 317 is different. The depth of recess 315 is sufficient to receive one cable. The depth of the curved recess region 316 increases from the end of recess 315 to recess 317 as indicated by a dashed line in FIG. 6. The bottom profile of the curved recess region 316 is not fully shown in FIG. 6, since the sectional view includes a region 319 of block 304 which is not recessed. Each of the curved recess regions 316 comprises such an island region 319 which is located between the two curved branches of the curved recess region 316. One of the branches extends above the plane of FIG. 6 and the other branch extends below the plane of FIG. 6. In addition, the island region 319 is located between the straight recess 317 and the two branches of the curved recess region 316.

Since the depth of the curved recess region 316 increases towards the straight recess 317, different cables can be laid upon one another. The depth of the straight recess 317 is sufficient to arrange two cables upon one another extending in the same straight direction. For example, a first cable may extend trough the lower recess 317 in FIG. 5 and may turn left into recess 315b through the recess region 316 shown in the bottom left part of FIG. 5. In addition, a second cable may extend trough recess 315a, may turn into the recess 317, thereby crossing (if viewed from above) the first cable.

The example concerning the extension of cables or electric lines given above refers to one specific application for laying three meandering cables. However, the use of the shaped block 304 shown in FIGS. 4 to 6 is not restricted to this application. Rather, for example, less or more than three cables can be laid using the block 304 shown in FIGS. 5 and 6.

The side surfaces of block 304 shown in FIG. 4 comprise recesses, in particular bores, 290a, 290b, 292a, 292b, 292c. Other recesses are located at the side surfaces which are not visible in FIG. 4. In the example shown, the side surface which extends in the direction of travel (on the right hand side in FIG. 4) comprises three recesses 292a, 292b, 292c. All recesses 292 contain an anchor 294a, 294c, wherein the anchor or recess 292b is not shown. The anchors 294 extend as projections from the side surface. When the cover layer is provided to fill the regions sideways of 304, the anchors 294 are embedded by the material of the cover layer.

The recesses 290a, 290b of the side surface which faces in the direction of travel also comprise anchors 291, wherein the anchor of recess 290a is not shown in FIG. 4. These anchors are fixed within the recesses 290 before the neighbouring block (not shown in FIG. 4) is placed near the side surface. The neighbouring block is moved towards the side surface of block 304 so that the anchors 291 are inserted in corresponding recesses of the neighbouring block. Then, or immediately before, filling material is introduced in the corresponding recesses of the neighbouring block in order to fill gaps between the anchors 291 and the corresponding recesses. The filling material may be a two-component adhesive.

Figure 7:
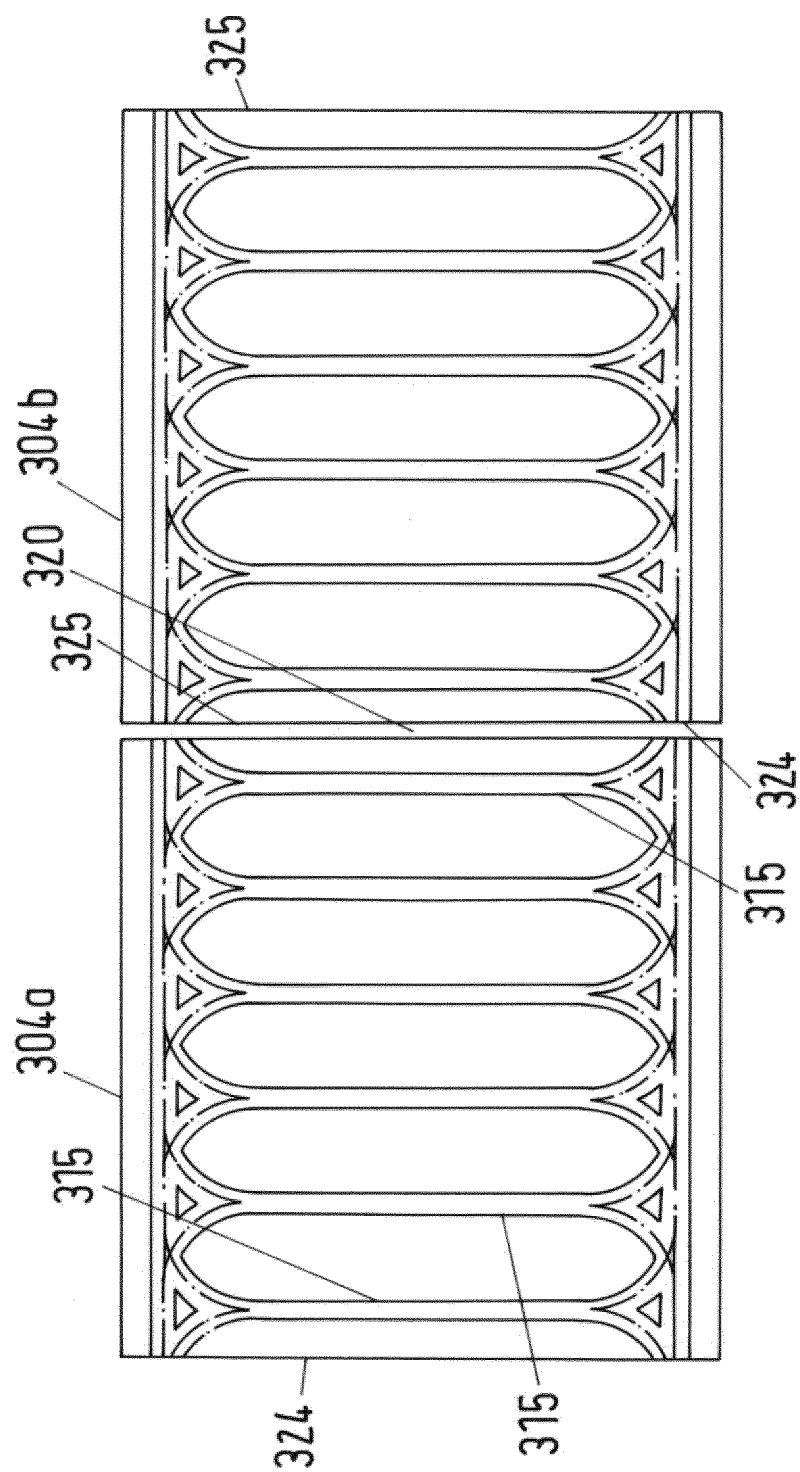
FIG. 7 shows a top view of an arrangement of two blocks according to FIGS. 4 to 6, FIG. 8 consecutive segments of a conductor arrangement which may be integrated in the route, for producing an electromagnetic field, FIG. 9 a shaped block similar to the block shown in FIG. 4, but comprising a cut-out in order to facilitate the mounting of the conductor arrangement, FIG. 10 a preferred embodiment of a three-phase conductor arrangement at the transition zone of two consecutive segments of the conductor arrangement, wherein a cut-out of at least one shaped block is used to direct cables within the route to devices and/or connections sideways of the route, and FIG. 11 an arrangement similar to the arrangement shown in FIG. 10, wherein the cut-out is used to form two star point connections of the three phases of the consecutive segments.

FIG. 7 shows two blocks of the type shown in FIGS. 4 to 6. The blocks 304a, 304b are adjacent to each other, forming a continuous or nearly continuous path of recesses for receiving electric lines, separated by a gap 320. The two blocks 304 may extend in the direction of travel together with further consecutive blocks not shown in FIG. 7, but in the manner shown in FIG. 1.

Each of the blocks 304a, 304b comprises end surfaces 324, 325 facing in the direction of travel. The end surfaces facing to the right in FIG. 7 are denoted by 325. The end surfaces which are facing to the opposite side are denoted by 324. The gap 320 between the end surfaces 324, 325 has a constant width if the blocks 304a, 304b extend in straight direction. To follow a slightly curved path of the route, the end surfaces 324, 325 may be angled with respect to each other. Alternatively, the end surfaces may extend in a retreating manner from their central region to the opposite sides of the block. "Retreating" means that the end surface as a whole does not extend within a single plane. Rather, the parts on opposite side of the centre line of the block could either be curved or extend along planes which are aligned at an angle relative to each other.

A groove 295 (not shown in FIG. 5, 6 but shown in FIG. 4) extends in the direction of travel at the centre line of the block 304. A magnetic core material can be placed in the groove 295 to form a magnetic core for the electric lines or cables to be placed within the recesses 315, 316, 317. Within this description, "core" does not mean that the electric lines are wound around the core, but that magnetic field lines of the electromagnetic field produced by the electric lines are bundled within the core, i.e. the magnetic flux is particularly high within the core. Since the electric lines extend transversely within the recesses 315, sections of the magnetic field lines extend in a longitudinal direction of the core (i.e. in the direction of travel) in regions below the recesses 315. However, in case of the arrangement of electric lines shown in FIGS. 10 and 11, the electric lines produce at each point in time a repeating sequence of magnetic poles extending in the direction of travel, wherein the repeating sequence corresponds to the sequence of the three phases. For example, in the case of a three-phase alternating current, having the phases U, V, W, a recess 315a carrying phase U is followed by a recess 315b carrying phase V which in turn is followed by a recess 315c carrying phase W. This sequence of phases U, V, W is repeated several times in the direction of travel.

Figure 8:
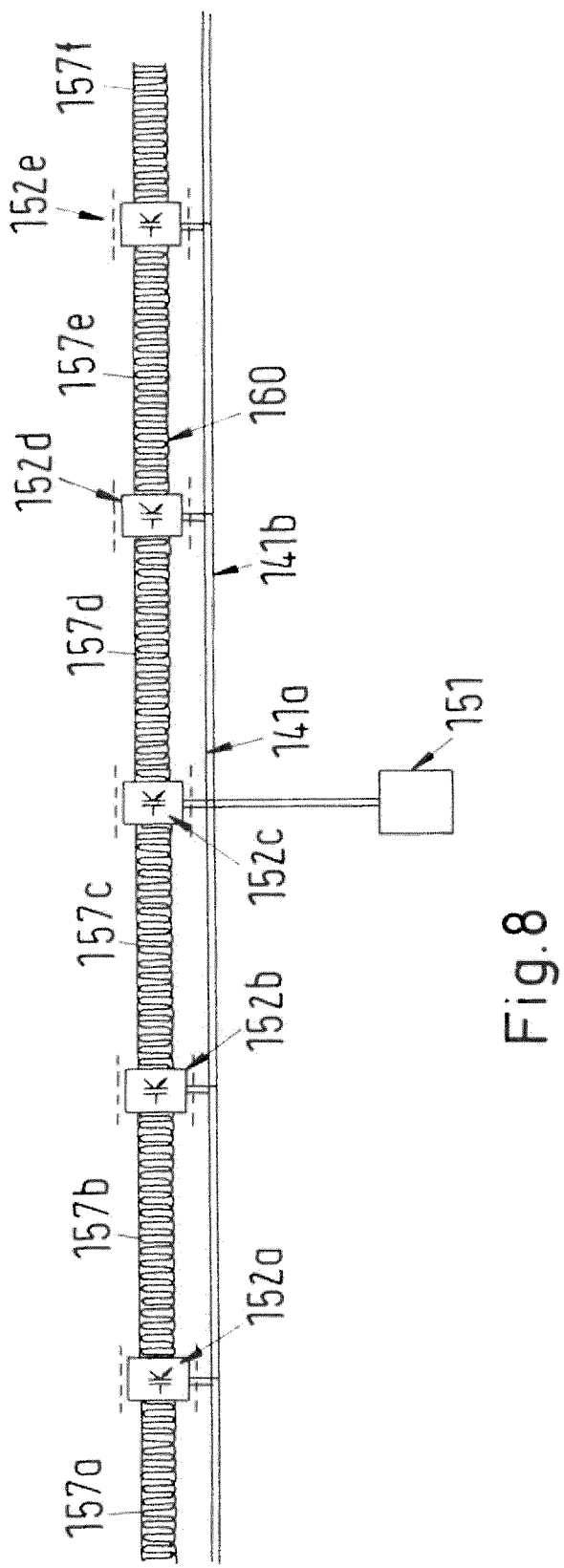

FIG. 8 shows six segments 157a to 157f of a conductor arrangement which extend along a path of travel (from right to left or vice versa) of a vehicle (not shown). The segments 157 can be operated independently of each other. They are electrically connected in parallel to each other. The vehicle may comprise a receiving device for receiving the electromagnetic field produced by one or more than one of the segments 157. If, for example, the receiving device of the vehicle is located above segment 157c at least this segment 157c is operated to produce an electromagnetic field and to provide energy to the vehicle. Furthermore, the vehicle may comprise energy storages which may be used to operate the vehicle if not sufficient energy is received from the segments 157.

At each interface between two consecutive segments 157, an inverter 152a to 152e is provided which is placed within a cavity, preferably within the ground sideways of the route.

ADC (direct current) power supply line 141a, 141b is also shown in FIG. 8. It is connected to an energy source 151, such as a power station for producing a direct current.

Figure 9:
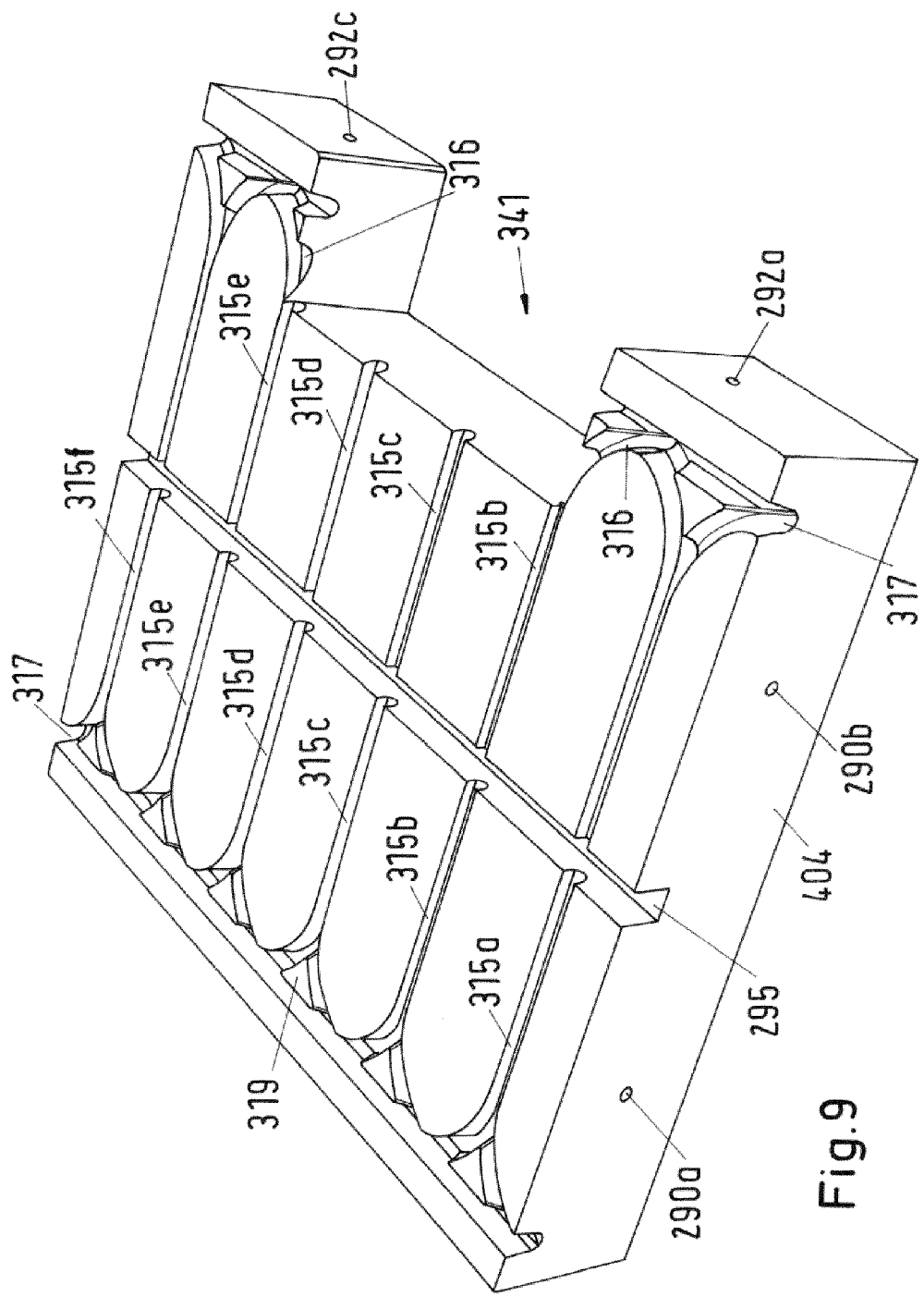

FIG. 9 shows a shaped block 404 which has the shape of block 304 of FIG. 4, with the exception that block 404 has a cut-out 341 at one side of the block. As will be described in the following, this facilitates completing the conductor arrangement made of electric lines which are held by the blocks in place. Same reference numerals in FIGS. 4 and 9 refer to the same features. One of the recesses 292, namely 292b, on the side surface of FIG. 4 is missing in block 404, since the corresponding region is part of the cut-out 341. However, anchors within recesses 292a, 292c provide sufficient strength of the connection between block 404 and the neighbouring region of the cover layer.

FIG. 10 shows one way of using a cut-out 609 corresponding to the cut-out 341 in FIG. 9. FIG. 10 shows the side limits 504 of an arrangement of consecutive shaped block by dashed lines, but does not show the limits between the consecutive shaped blocks.

The conductor arrangement 507a, 507b, 507c; 508a, 508b, 508c is a three-phase conductor arrangement, i.e. each of the two segments of the conductor arrangement shown in FIG. 10 comprises three phase lines for conducting three phases of a three phase alternating electric current. One of the three phases is indicated by a single line, the second of the three phases is indicated by a double line and the third of the three phases is indicated by a triple line. All electric lines are extending in a meandering manner in the direction of travel (from left to right or vice versa). The region shown in FIG. 10 is a transition region of two consecutive segments of the conductor arrangement. Each segment can be operated separately of each other, but the segments can also be operated simultaneously. FIG. 10 shows a preferred embodiment of a basic concept, namely the concept of overlapping regions of the consecutive segments.

The segment shown on the left hand side in FIG. 10 comprises phase lines 507a, 507b, 507c. Following the extension of these phase lines 507, from left to right, each phase line 507 which reaches the cut-out 609 is conducted away from the consecutive line of shaped blocks towards any device (not shown) for operating the phase lines 507. For example, phase line 507b reaches cut-out 609 where the cut-out 609 ends. In contrast to phase line 507b, phase lines 507a, 507c reach the cut-out 609 with a line section which extends from the opposite side of the line of shaped blocks towards the cut-out 609.

The three phase lines 507 each comprise line sections which extend transversely to the direction of travel. These transversely extending sections form a repeating sequence of phases in the direction of travel, i.e. a section of the first phase line 507a is followed by a section of the second phase line 507b which is followed by a line section of the third phase line 507c and so on. In order to continue with this repeated sequence of the phase lines, a phase line 508b (the second phase line) of the neighbouring segment is conducted through the cut-out 609 so that it forms a transversely extending line section in between the first phase line 507a and the third phase line 507c of the other segment where they reach the cut-out 609. In other words, the second phase line 508b of the second segment replaces the second phase line 507b of the first segment in order to continue with the repeated sequence of phase lines. The other phase lines of the second segment, namely the first phase line 508a and the third phase line 508c are conducted through cut-out 609 in a corresponding manner so that the sequence of phases, if the extension in the direction of travel is considered, is the same as for the first segment on the left hand side of FIG. 10.

With reference to FIG. 9, the cut-out 341 of block 404 extends from top to bottom of the block 404 and this cut-out 341 is used to conduct the phase lines (not shown in FIG. 9) from the recesses 315, 316 downwards and away from the shaped block 404 towards to the devices mentioned above. The cut-out is filled by the material of the cover layer when this layer is generated. This means, that the connections of the phase lines from these devices towards the shaped block are covered by a thicker layer of the cover layer material compared to the thickness of the cover layer material on top of the shaped block 404. Therefore, the connections of the phase lines are well protected.

FIG. 11 shows a second way of using a cut-out 609 of a line of consecutive shaped blocks. Same reference numerals in FIG. 10 and FIG. 11 refer to the same features and elements.

FIG. 11 shows the transition region of two consecutive segments, for example the segment shown on the right hand side in FIG. 10 and a further segment of the conductor arrangement. The phase lines of this further segment are denoted by 509a (first phase line), 509b (second phase line) and 509c (third phase line) of the further segment. In the embodiment shown in FIG. 11, the cut-out 609 is used as an area for establishing electric connections between the three phases of each segment, i.e. a star point connection is made for each segment. The star points are denoted by 511a or 511b. Preferably, the location of the star point 511 is at a greater distance to the upper surface of the cover layer than the line sections of the phase lines where the phase lines are located within the recesses or spaces which are defined by the shaped blocks. Therefore, the star point connections are well protected.

The idea of using a cut-out of at least one shaped block for establishing electric connections of different phase lines of a conductor arrangement is not restricted to the case shown in FIG. 11. Rather, the meandering extension of the phase line might differ, the number of the phase line per segment might differ, the phase lines might be arranged in a different manner or other embodiments might differ by other features compared to the embodiment shown in FIG. 11. In any case, it is preferred that the cut-out is used to establish electric connections to and/or between phase lines of the same segment and/or phase lines of consecutive segments. If phase lines of consecutive segments are connected to each other, these segments are not connected in parallel, but in series to each other.

The invention claimed is:

1. A route for vehicles driving on a surface of the route, wherein the route comprises:
   a plurality of shaped blocks adapted to position and/or to hold a plurality of line sections of one or more electric lines,
   each shaped block comprises recesses forming spaces and/or projections delimiting spaces for receiving at least one of the line sections,
   the electric line or lines extend(s) through the spaces,
   the electric line or lines extend(s) along the surface of the route in and/or about a travelling direction of vehicles which are driving on the route,
   the shaped blocks and the electric line or lines are supported by a base layer of the route,
   the shaped blocks and the electric line or lines are covered by a cover layer of the route,
   a material of the cover layer also covers regions of the base layer that extend sideways of the shaped blocks so that the shaped blocks and the cover layer form an integrated layer on top of the base layer.

2. The route of claim 1, wherein an intermediate layer is located between the base layer and the integrated layer, the intermediate layer decoupling the integrated layer and the base layer from each other.

3. The route of claim 1, wherein the material of the cover layer fills gaps between the line sections and surfaces of the spaces which are formed by the recesses and/or which are delimited by the projections.

4. The route of claim 1, wherein the same type of material is used for the shaped blocks and for the cover layer.

5. The route of claim 1, wherein a boundary surface of the shaped blocks towards the cover layer has been cleaned from foreign material and/or has partly been removed before the material of the cover layer has been placed next to the shaped blocks to form the integrated layer.

6. The route of claim 1, wherein the route comprises first protrusions, which protrude from the surface of at least one of the shaped blocks, and wherein the first protrusions are fully embedded in the material of the cover layer.

7. The route of claim 1, wherein the route comprises second protrusions, which protrude from the surface of at least one of the shaped blocks into a pocket of a neighbouring shaped block.

8. The route of claim 1, wherein a magnetic core material is integrated in the integrated layer.

9. The route of claim 8, wherein the magnetic core material is placed within a core space formed by recesses and/or delimited by projections of the shaped block.

10. The route of claim 9, wherein the core space extends in the driving direction of vehicles driving on the route.

11. The route of claim 1, wherein a shielding layer of electrically conducting material is placed below the shaped blocks.

12. A method of building a route for vehicles driving on a surface of the route, comprising:
   providing a base layer of the route for supporting shaped blocks and an electric line or electric lines,
   providing a plurality of shaped blocks for positioning and/or holding a plurality of line sections of one or more electric lines, wherein each shaped block comprises recesses forming spaces and/or comprises projections delimiting spaces for receiving at least one of the line sections,
   laying the electric line or lines so that it/they extend(s) through the spaces and so that it/they extend(s) along the surface of the route in and/or about a travelling direction of vehicles which are driving on the route,
   covering the shaped blocks and the electric line or lines by a cover layer of the route,
   placing material of the cover layer also over regions of the base layer that extend sideways of the shaped blocks so that the shaped blocks and the cover layer form an integrated layer on top of the base layer.

13. The method of claim 12, wherein an intermediate layer is placed between the base layer and the integrated layer, the intermediate layer decoupling the integrated layer and the base layer from each other.

14. The method of claim 12, wherein gaps between the line sections and surfaces of the spaces, which are formed by the recesses-and/or which are delimited by the projections, are filled by the material of the cover layer.

15. The method of claim 12, wherein the same type of material is used for the shaped blocks and for the cover layer.

16. The method of claim 12, wherein a boundary surface of the shaped blocks towards the cover layer is cleaned from foreign material and/or is partly removed before the material of the cover layer is placed next to the shaped blocks in order to form the integrated layer.

17. The method of claim 12, wherein first protrusions are provided, which protrude from the surface of at least one of the shaped blocks, and wherein the first protrusions are fully enclosed by the material of the cover layer.

18. The method of claim 12, wherein second protrusions are provided so that they protrude from the surface of at least one of the shaped blocks into a pocket of a neighbouring shaped block.

19. The method of claim 18, wherein the second protrusions are fixed within the respective pocket of a neighbouring shaped block before the cover layer is placed on the shaped blocks and the electric line or lines.

20. The method of claim 12, wherein a magnetic core material is integrated in the integrated layer.

21. The method of claim 20, wherein the magnetic core material is placed within a core space formed by recesses and/or delimited by projections of the shaped block.

22. The method of claim 21, wherein the core space extends in the driving direction of vehicles driving on the route.

23. The method of claim 12, wherein a shielding layer of electrically conducting material is placed below the shaped blocks.

* * * * *